United States Patent
Ikeda

(10) Patent No.: US 7,066,818 B2
(45) Date of Patent: Jun. 27, 2006

(54) COMMUNICATION DEVICE, ADDRESS INPUT SUPPORTING METHOD, AND INFORMATION STORAGE MEDIUM

(75) Inventor: Osamu Ikeda, Tokyo (JP)

(73) Assignees: Konami Corporation, Tokyo (JP); Konami Computer Entertainmant Tokyo, Inc., Tokyo (JP)

( * ) Notice: Subject to any disclaimer, the term of this patent is extended or adjusted under 35 U.S.C. 154(b) by 1021 days.

(21) Appl. No.: 09/947,434

(22) Filed: Sep. 7, 2001

(65) Prior Publication Data
US 2002/0027899 A1    Mar. 7, 2002

(30) Foreign Application Priority Data
Sep. 7, 2000    (JP) .............................. 2000-272355

(51) Int. Cl.
H04L 12/66    (2006.01)
H04L 12/28    (2006.01)
G06F 15/16    (2006.01)

(52) U.S. Cl. .................... 463/42; 370/352; 370/412; 709/203; 709/217; 463/42; 463/41

(58) Field of Classification Search ................. 463/40, 463/39, 31, 19, 42, 34, 17, 7, 18; 370/412, 370/352, 486, 487, 490
See application file for complete search history.

(56) References Cited

U.S. PATENT DOCUMENTS 5,797,098 A    8/1998    Schroeder et al.
6,092,100 A    7/2000    Berstis et al.
6,146,277 A *  11/2000   Ikeda .......................... 463/43
6,203,433 B1 * 3/2001    Kume ......................... 463/42
6,810,528 B1 * 10/2004   Chatani ...................... 725/109

FOREIGN PATENT DOCUMENTS

GB    2 165 071 A    4/1986
JP    11-98171       4/1999
JP    2000-132301    5/2000

OTHER PUBLICATIONS

Notice of Rejection for Japanese Application No. 2000-272355, filed on Sep. 7, 2000, Partial.
Paul F. Tsuchiya, "Efficient Utilization of Two-Level Hierarchical Addresses" (p. 1017 paragraph 2.0—p. 1018, paragraph 2.0), Dec. 6, 1992.
European Search Report.

* cited by examiner

Primary Examiner—Hanh Nguyen
(74) Attorney, Agent, or Firm—Sughrue Mion, PLLC

(57) ABSTRACT

Input of an address including a network number and a host number can be facilitated. During data communication, part or all of the network number of a destination IP address is acquired and sequentially stored. When an IP address is to be input, part or all of one network number is selected among those which have been stored based on user designation, and user input of any remaining part of the network number and the host number is received. The part or all of the network number and any remaining part of the network number and the host number are combined to form an input IP address.

12 Claims, 9 Drawing Sheets

```
192. 168.  90. 10
192. 168.  90. 12
143.  90.   9. 20
210.  81. 100. 99
192. 168. 100. 14
192. 168. 120.  9
143.  90.  55. 11
143.  90.  55. 24
210.  81. 100. 80
```

FIG. 4
192.168.<
FIG. 5
192.168.<
PRESSING CROSS-SHAPED KEY DOWNWARD  PRESSING CROSS-SHAPED KEY UPWARD
143.90.<
PRESSING CROSS-SHAPED KEY DOWNWARD 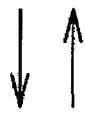 PRESSING CROSS-SHAPED KEY UPWARD
210.81.<
⋮

COMMUNICATION DEVICE, ADDRESS INPUT SUPPORTING METHOD, AND INFORMATION STORAGE MEDIUM

BACKGROUND OF THE INVENTION

1. Field of the Invention

The present invention relates to a communication device, an address input supporting method, and an information storage medium, and more particularly to a technique for supporting (aiding) input of an address by users.

2. Description of the Prior Art

In recent years, online competitive games utilizing the Internet are attracting widespread attention. This kind of online competitive game generally uses a method by which a player wishing to play an on-line game with another player accesses a specific game server (lobby server) to invite another player to join the game and then exchanges IP addresses with the opponent to start the game, or a method by which the player directly inputs the IP address of the opponent to a game machine or the like to start the game with the opponent with that IP address.

When the player wishes to play the on-line game with a friend or previous opponent, the latter of the above two methods is more suitable. However, directly inputting an IP address is generally troublesome, especially when using a game machine provided with no input device specialized for numerical inputs, for example a ten keypad, because the numerals must be input by operating a keyboard displayed on a TV screen with a cross-shaped key or the like, i.e. the IP address must be input using a so-called software keyboard.

This inconvenience can be avoided by storing a history of IP addresses of opponents in a memory card or the like and choosing an IP address from there, so that the opponent is designated only by selecting the IP address, making it possible to quickly start the on-line game. However, an IP address maybe dynamically allocated whenever a dial-up connection, for example, is made to an Internet service provider (ISP), whereby the IP address stored in the memory card or the like is not necessarily the current IP address of the friend or previous opponent. Therefore, any method supporting input of an IP address has its limits.

SUMMARY OF THE INVENTION

The present invention was conceived with the aforementioned problems in mind, with the objective of providing a communication device, an address input supporting method, and an information storage medium, allowing easy input of an address including a network number and a host number, even when a destination address is dynamically allocated every time a connection is made.

A communication device for transmitting data to an address including a network number and a host number according to one aspect of the present invention comprises a network number acquisition means for acquiring part or all of the network number of a destination address during data communication, a network number storage means for sequentially storing the part or all of the network number acquired by said network number acquisition means, a network number selection means for selecting the part or all of one network number among those which have been stored in said network number storage means based on a designation made by a user, an input means used for inputting a remaining part of said network number and the host number, and data transmission means for transmitting data to the address including the part or all of said network number selected by said network number selection means and the remaining part of said network number and the host number input by said input means.

An address input supporting method for supporting input of an address including a network number and a host number according to another aspect of the present invention comprises a network number acquisition step for acquiring part or all of the network number of a destination address during data communication, a network number storage step for sequentially storing the part or all of the network number acquired in said network number acquisition step, a network number selection step for selecting the part or all of one network number among those which have been stored in said network number storage step based on a designation made by the user, an input step for receiving user input of any remaining part of said network number and the host number, and an input address determination step for determining, as a user input address, an address including part or all of said network number selected in said network number selection step, and any remaining part of said network number and the host number input in said input step.

An information storage medium according to a further aspect of the present invention stores a program for supporting input of an address including a network number and a host number, and said program is used for computer execution of a network number acquisition step for acquiring part or all of the network number of a destination address during data communication, a network number storage step for sequentially storing the part or all of the network number acquired in said network number acquisition step, a network number selection step for selecting part or all of one network number among those which have been stored in said network number storage step based on a designation made by the user, an input step for receiving user input of any remaining part of said network number and the host number, and an input address determination step for determining, as a user input address, an address including the part or all of said network number selected in said network number selection step, and any remaining part of said network number and the host number input in said input step.

According to the present invention, part or all of the network number of a destination address is acquired and sequentially stored during data communication. When the address is to be input, the part or all of one network number is selected among those previously stored based on user designation, and a remaining part of the network number and the host number are input by the user. The address including the part or all of the network number thus selected, and any remaining part of the network number and the host number thus input is used as the user input address. Even when the destination address is the address dynamically allocated every time a connection is made, at least the network number is usually the same because the ISP, the access point, or the like is the same. According to the present invention, a part or all of the network number need only be selected, and therefore the user can easily input the address.

BRIEF DESCRIPTION OF THE DRAWINGS

FIGS. 4 to 7 are views explaining a procedure for inputting an IP address.

DESCRIPTION OF THE PREFERRED EMBODIMENTS

The entire disclosure of the corresponding Japanese application 2000-272355 filed on Sep. 7, 2000 including specification, claims, drawings and summary, is incorporated herein by reference.

Preferred embodiments of the present invention will now be described in detail with reference to the drawings.

Figure 1:
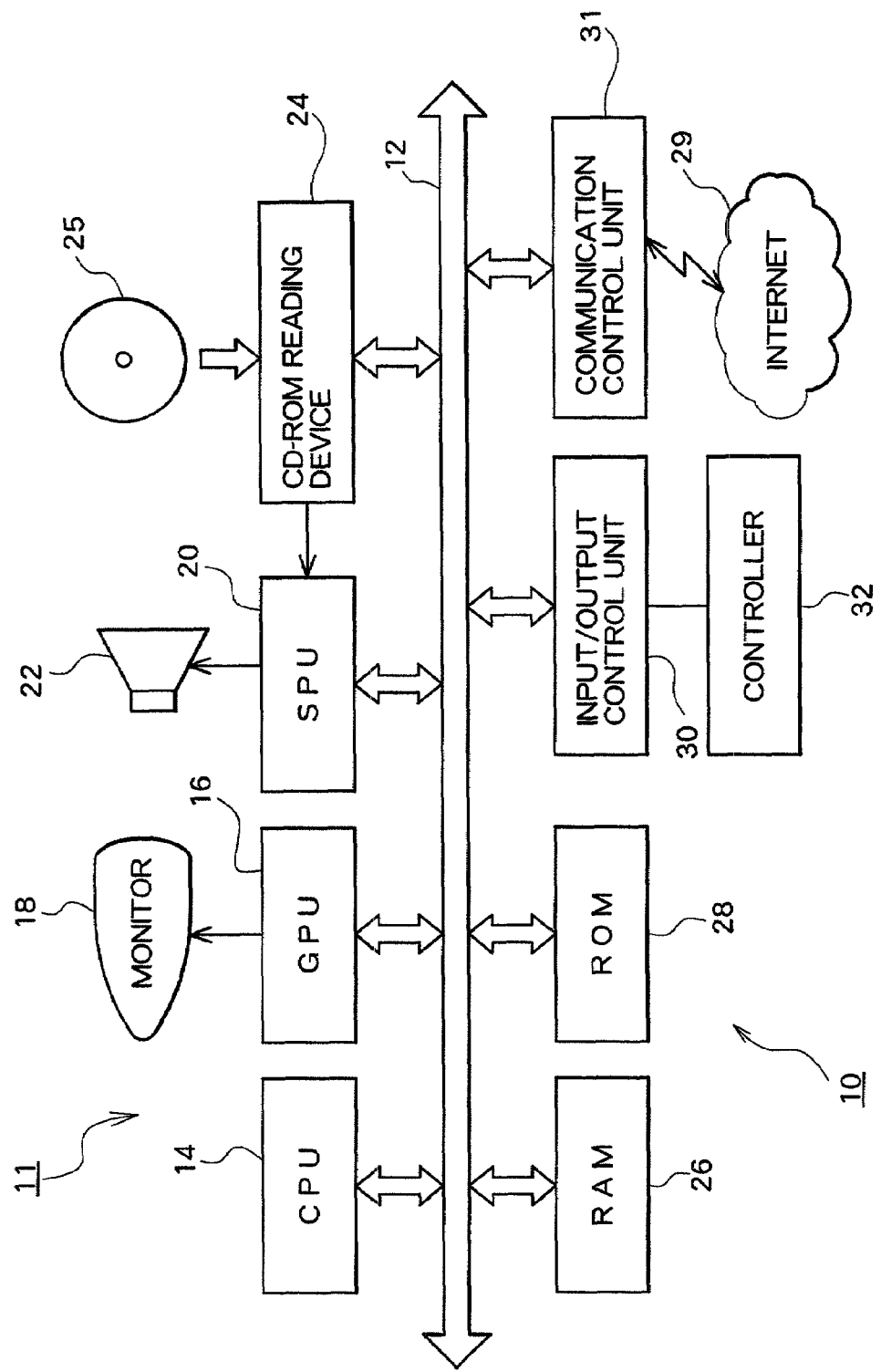
FIG. 1 illustrates a configuration of a game device according to an embodiment of the present invention.

FIG. 1 illustrates a configuration of a game device according to an embodiment of the present invention. This game device 10 allows an online competitive game to be implemented by accessing the Internet 29 through a communication control unit 31. An aspect of the game device 10 as a communication device for implementing the online competitive game will be mainly described below.

The game device 10 is composed of a home-use game machine 11 connected to a monitor 18 and a speaker 22, and a CD-ROM 25 which provides an information storage medium mounted in the machine. While the CD-ROM 25 is used for supplying a game program and game data to the home-use game machine 11 in this embodiment, any other information storage media, such as a DVD-ROM and a ROM card, can be employed. Alternatively, the game program and the game data can be remotely supplied to the home-use game machine 11 through a communication network such as the Internet 29.

The home-use game machine 11 includes a CPU 14, a GPU 16, an SPU 20, a CD-ROM reading device 24, a RAM 26, a ROM 28, an input/output control unit 30, and the communication control unit 31, interconnected via a bus 12 for data exchange, and a controller 32 connected to the input/output control unit 30 with a cord. The components of the home-use game machine 11 other than the controller 32 are accommodated via predetermined housing. By way of example, the monitor 18 may be a home TV receiver, and the speaker 22 may be a speaker incorporated into the home TV receiver.

The CPU 14 controls respective elements of the home-use game machine 11 based on the operating system stored in the ROM 28 and the game program read from the CD-ROM 25. The bus 12 is used for exchanging addresses and data among the elements of the home-use game machine 11. The ROM 28 stores the operating system, a program necessary for controlling overall operation of the home-use game machine 11. The RAM 26 is used for storing the game program and game data read from the CD-ROM 25 where necessary, and also used for working storage. The GPU (graphics processing unit) 16 including frame buffer receives image data from the CPU 14 to draw a game image in the frame buffer, and converts the content into a video signal, which is output to the monitor 18 at predetermined timing.

The SPU (sound processing unit) 20 including sound buffer reproduces data for music, game effect sounds, and so on, which are read from the CD-ROM 25 and stored in the sound buffer, and outputs sound with the speaker 22. The CD-ROM reading device 24 reads the game program and the game data stored in the CD-ROM 25 in accordance with an instruction from the CPU 14.

The input/output control unit 30 is an interface for connecting one or more external input/output devices with the home-use game machine 11. While the controller 32 is detachably connected to the unit 30 in this example, other devices including an auxiliary storage device, such as a memory card, can be connected thereto. The controller 32 is an input means via which a player operates a game, and is provided with a variety of buttons. The input/output control unit 30 periodically (for example, every 1/60 of a second) scans the operation states of the various buttons of the controller 32 and supplies a signal indicative of the scanning result to the CPU 14 through the bus 12. The CPU 14 judges the game operation of the player based on that signal. The communication control unit 31 is, for example, a modem or a terminal adapter for connecting to Internet 29 via, for example, an ISP to implement an online competitive game or receive the game program and game data from the Internet 29.

Figures 2, 3:
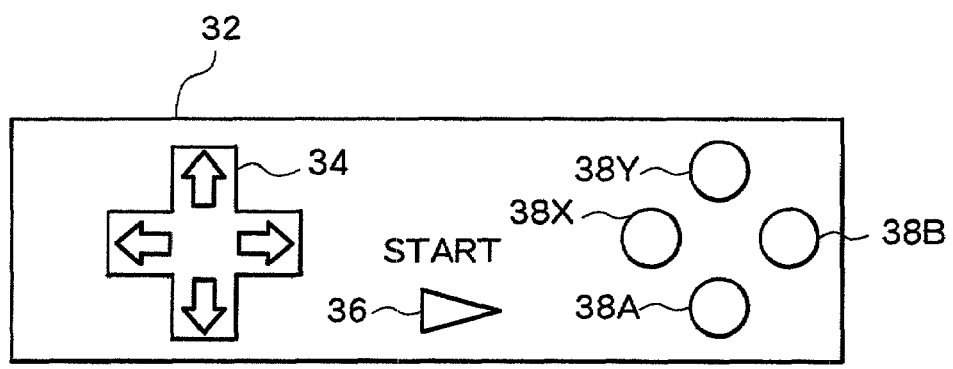
FIG. 2 illustrates an example of a controller.
FIG. 3 illustrates an example of an IP address history.

FIG. 2 illustrates an example of the controller 32. The controller 32 shown in this figure is commonly used for a variety of games, and includes a cross-shaped key 34, a start button 36, and buttons 38X, 38Y, 38A, and 38B provided on the surface. The key 34 in the form of a cross is generally used in designating a direction in which a character or a cursor moves. The start button 36 is a small, triangular press button generally used to either start or forcibly end a game. The buttons 38X, 38Y, 38A, and 38B are used for other game operations.

Description will now be made of a technique for supporting (aiding) a player to directly input an IP address of an opponent in order to start an online competitive game using the game device 10 of the above-described configuration.

This game device 10 is designed to sequentially store the IP addresses of opponents in the RAM 26 or a memory card for later use in on-line competitive games using the Internet 29. FIG. 3 shows an example of an IP address history stored in the RAM 26 or the memory card (not shown) connected to the inputloutput control unit 30. The uppermost IP address shown in the figure is the IP address of the previous opponent, and this is followed by the IP addresses of earlier opponents arranged in reverse chronological order. Among the IP addresses listed in FIG. 3, the IP address having an upper 8 bits of, for example, "192" or "210" belongs to Class C, and the network number (including a class identifier) is indicated by the upper 24 bits thereof (i.e., 192.168.90. represents the network address portion of IP address 192.168.90.10 in a Class C network). The IP address with an upper 8 bits of "143" belongs to Class B, and the network number is indicated by the upper 16 bits thereof (i.e., 144.90. represent the network address portion of IP address 143.090.9.20 in a Class B network).

Using such an IP address history, the game device 10 causes an input form to be displayed on the monitor 18 when the IP address of an opponent is to be directly input, and the upper 16 bits (a part or all of the network number) of the IP address of the previous opponent is displayed together with a cursor. FIG. 4 illustrates an input form portion of a screen first displayed on the monitor 18 when the player is prompted to directly input the IP address. The square frame shown in the figure is the input form, and the symbol "<" denotes a cursor. In this figure, the upper 16 bits of the IP address shown on the uppermost line of the IP address history list in FIG. 3 is displayed.

Thereafter, by the player's operation of the cross-shaped key 34 of the controller 32 in the upper and lower directions, the upper 16 bits of the IP addresses contained in the IP address history are sequentially displayed. FIG. 5 shows part of the images sequentially displayed on the monitor 18 by the player's operation of the cross-shaped key 34 upward and downward when the player is prompted to directly input the IP address. As illustrated in FIG. 5, when the player operates the cross-shaped key 34 downward with the image of FIG. 4 displayed on the monitor, the upper 16 bits of the IP address immediately preceding (i.e. older than) those currently displayed on the monitor 18 is selected and displayed among the IP addresses in the IP address history. More specifically, when the portion "192. 168" of the address "192. 168. 90. 10" in the IP address history of FIG. 3 is displayed on the monitor 18 and the player operates the cross-shaped key 34 downward, the upper 16 bits of the address "143. 90. 9. 20", i.e. the portion "143. 30" is displayed next on the monitor 18 skipping the address "192. 168. 90. 12" having the same upper 16 bits. When the player operates the key 34 upward, the upper 16 bits of the IP address immediately succeeding (i.e. newer) than those currently displayed on the monitor 18 are selected and displayed among the IP addresses in the IP address history.

Figure 6:
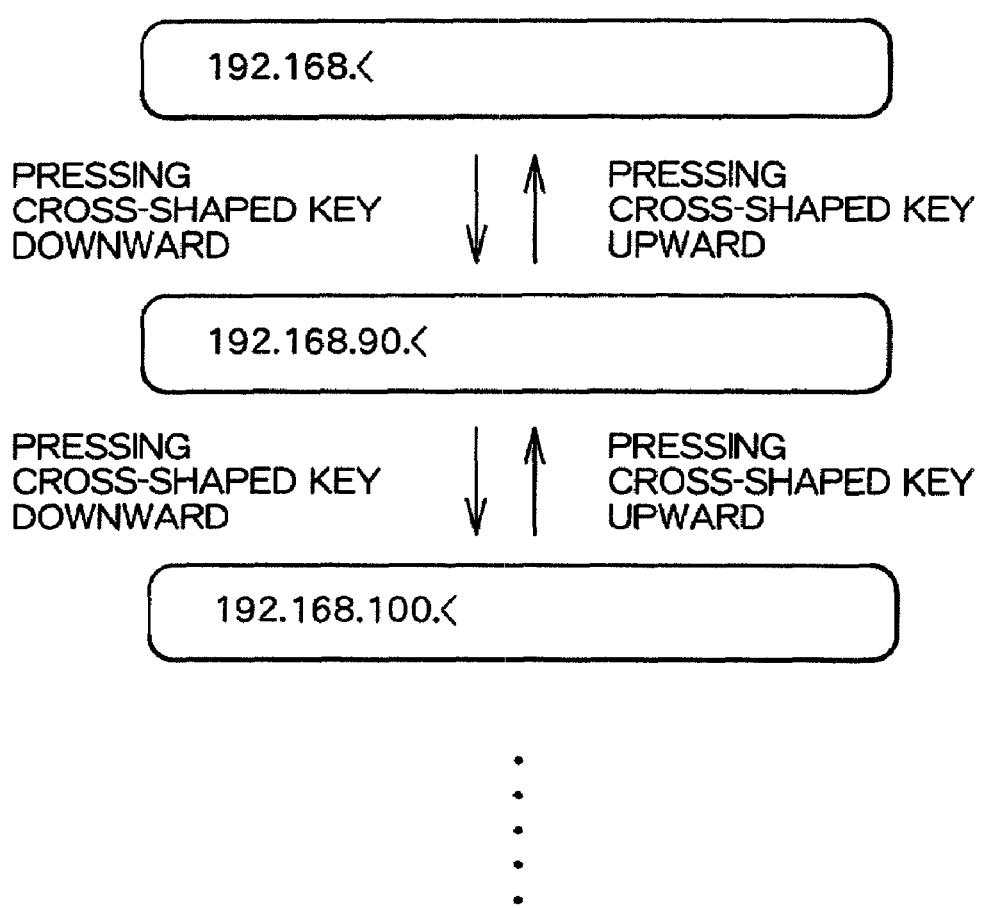

When the player presses the button 38A of the controller 32 while the upper 16 bits of a certain IP address are displayed, it is determined that the displayed upper 16 bits are the upper 16 bits of the IP address to be input. When the player further operates the cross-shaped key 34 upward or downward in this state, the 17th to 24th bits, i.e. the next 8 bits, of the IP addresses having the common determined part are sequentially displayed on the right side of the determined part. FIG. 6 illustrates an input form portion of an image displayed on the monitor 18 at this stage. For example, when the part "192. 168" is displayed on the monitor 18 and the player presses the button 38A, the part "192. 168" is determined to be the upper 16 bits of the input IP address. When the cross-shaped key 34 is further operated upward or downward in this state, the IP addresses having the upper 16 bits of "192. 168" are sequentially read from the IP address history, and the portion of the IP address corresponding to the 17th to 24th bits is sequentially displayed on the right. In the example of the IP address history shown in FIG. 3, when the player presses the button 38A with the part "192. 168" displayed on the monitor 18 and further operates the cross-shaped key 34 upward or downward, numbers "90", "100", "120", . . . are sequentially displayed on the right.

Figure 7:
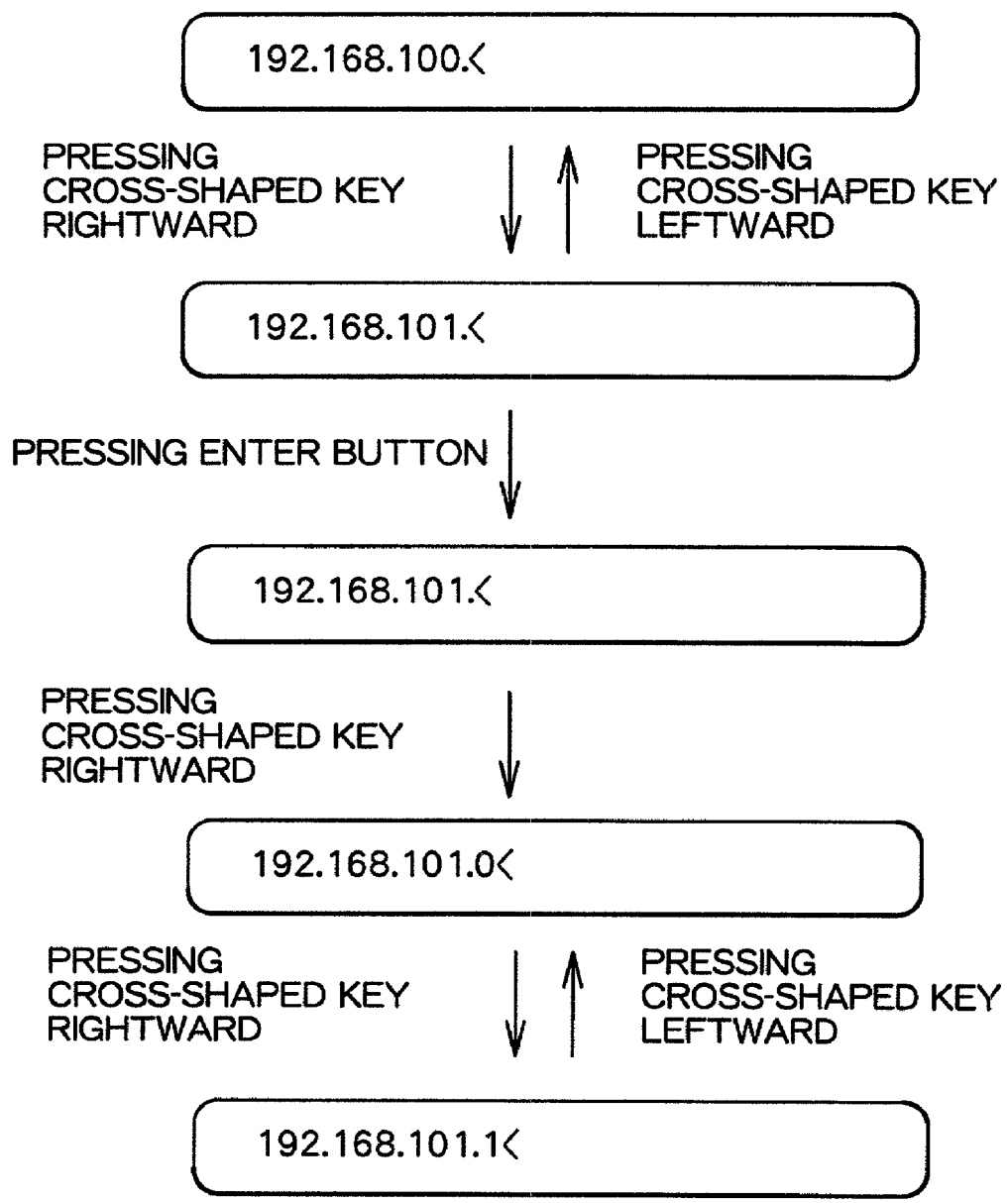
Figure 8:
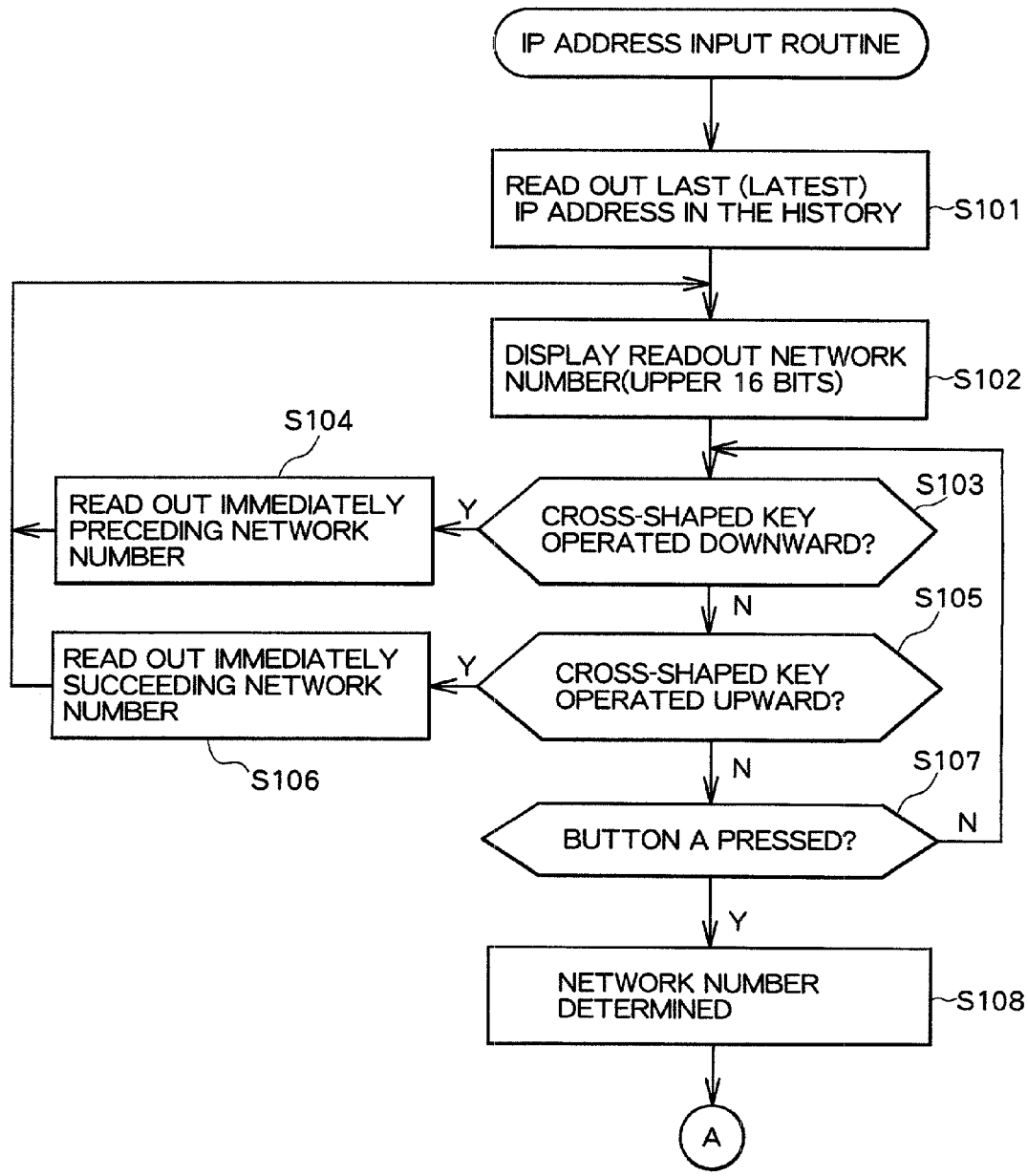
FIGS. 8 to 11 are flow charts explaining a process for supporting input of an IP address.
Figure 9:
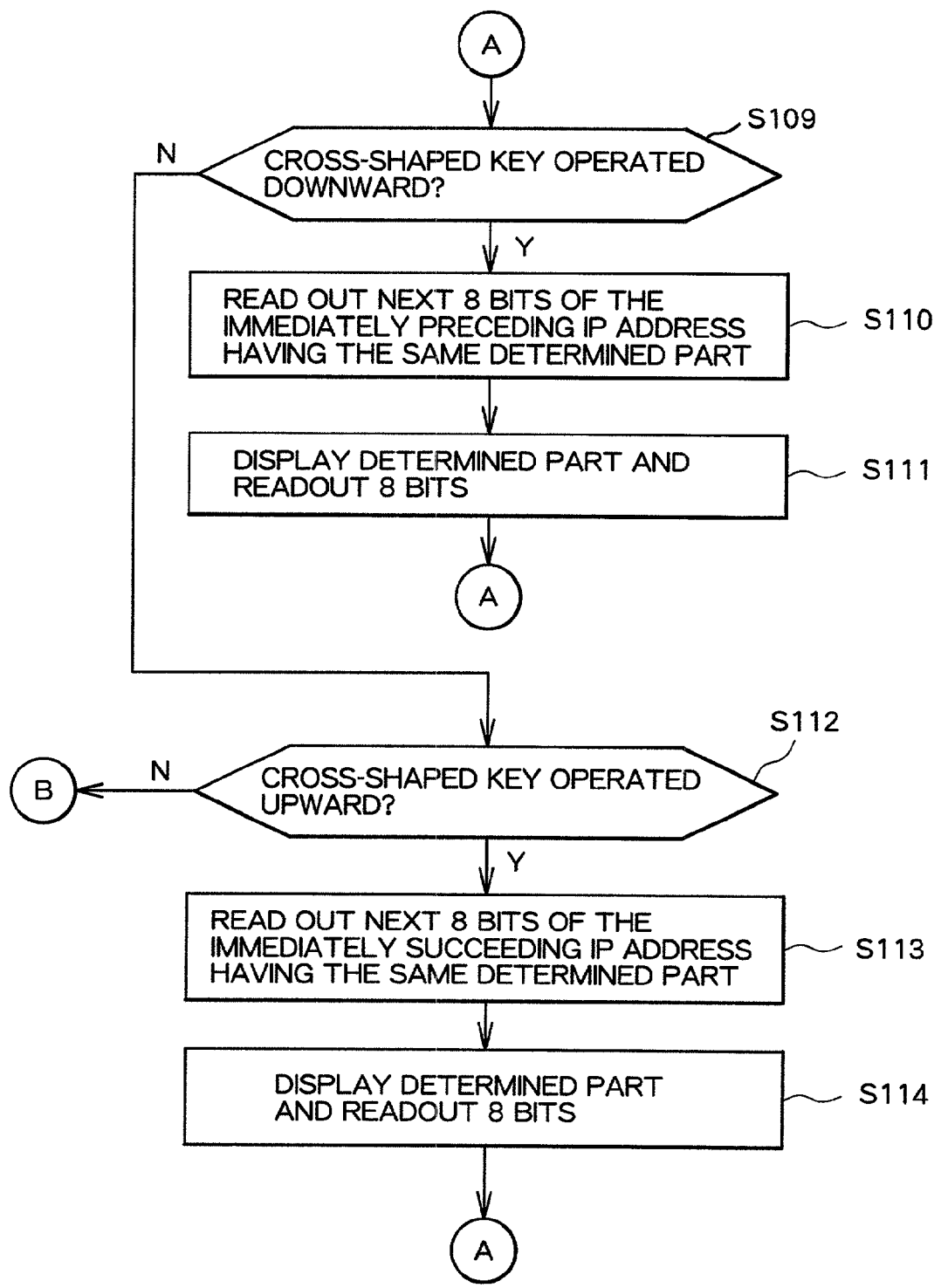
Figure 10:
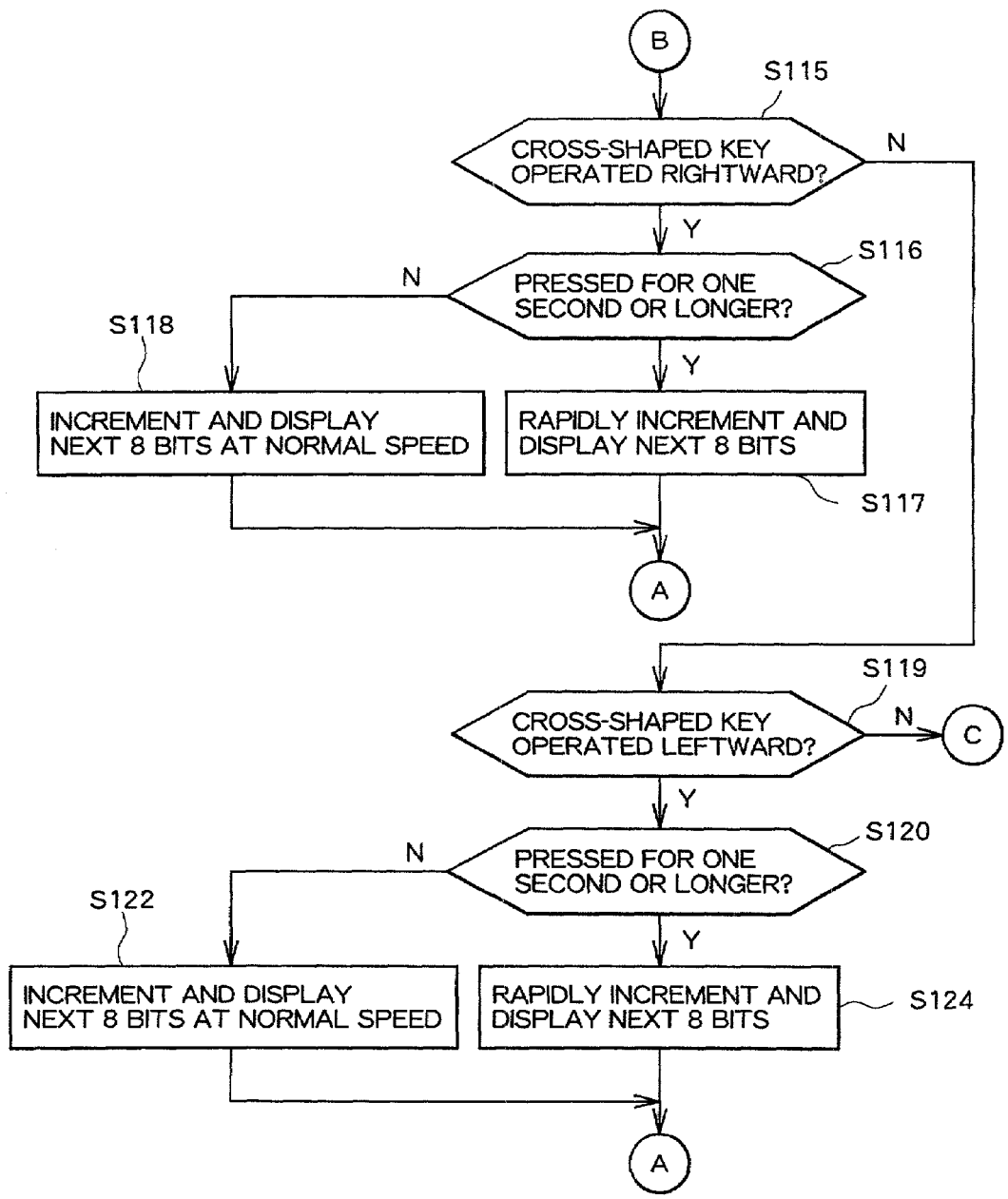
Figure 11:
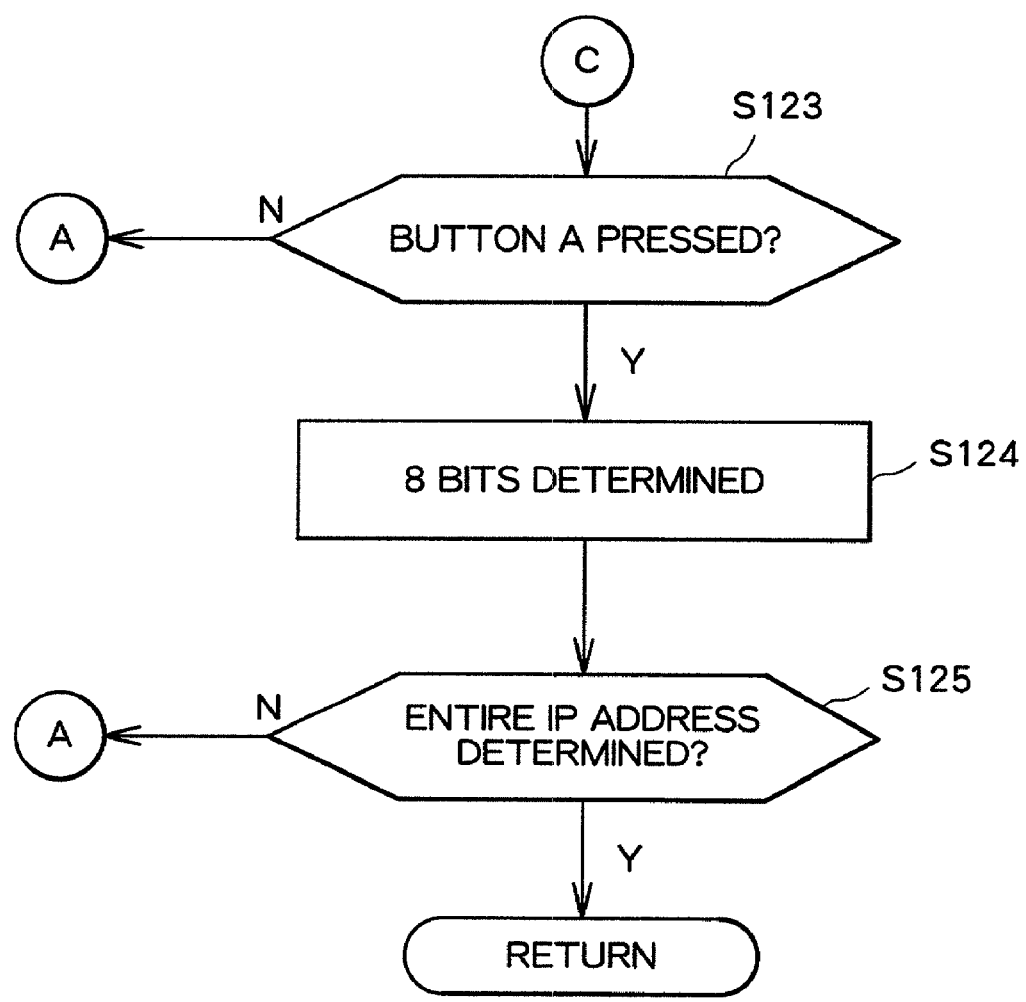

When the player operates the cross-shaped key 34 rightward or leftward in this state, the last 8 bit number (in decimal notation) of the IP address currently displayed on the monitor 18 is incremented or decremented. FIG. 7 shows an input form portion of an image displayed on the monitor 18 at this stage. As illustrated in FIG. 7, when the cross-shaped key 34 is operated rightward or leftward while the part of the address "192. 168. 100", for example, is displayed, the numeral "100", i.e. the last 8 bits, is incremented or decremented. More specifically, the numeral is incremented from "100" by one for each rightward operation of the cross-shaped key 34. On the other hand, the numeral is decremented from "100" by one for each leftward operation of the key 34. For this operation, when the cross-shaped key 34 is continuously pressed for a predetermined time (for one second, for example) in the same direction, the speed of incrementing or decrementing the numeral is enhanced. When the player sets a desired value and presses the button 38A, that 8-bit value is chosen. Thereafter, the last 8 bits are similarly set by operating the cross-shaped key 34, and determined by pressing the button 38A. The IP address having all the numerals thus determined is used for a main game process as an IP address of the on-line opponent.

The device may also be designed so that depression of the button 38B causes cancellation of one digit or 8 bits thus input to enable setting of a new value. Further, depression of the button 38Y may cause a keyboard image to be displayed in another display area as well as a cursor operable by the cross-shaped key 34, so that the player can select a key in the keyboard to directly enter the numbers forming the IP address in a sequential manner.

FIG. 8 to FIG. 11 are flow charts for describing a process performed by the game device 10 in order to implement the above-described address input supporting method. This process is performed by the CPU 14 in accordance with the game program stored in the CD-ROM 25 when a player directly inputs the IP address of an on-line opponent in the on-line competitive game. As illustrated, at the beginning of this process, the last IP address in the IP address history is readout (S101). The upper 16 bits of the readout IP address (a part or all of the network number) is displayed in the input form in a left-justified manner (S102). When the cross-shaped key 34 is operated downward (S103), an IP address having different upper 16 bits from those currently displayed on the monitor 18 and immediately preceding (i.e. older than) the currently displayed IP address in the IP address history is read out (S104), and the upper 16 bits of the readout IP address is overwritten in the input form in the left-justified manner (S102). When there is no such IP address, the process awaits upward operation of the cross-shaped key 34 or depression of the button 38A.

When the cross-shaped key 34 is operated upward (S105), an IP address having upper 16 bits different from those currently displayed on the monitor 18 and immediately succeeding (newer than) the currently displayed IP address in the IP address history is read out (S106), and the upper 16 bits of the readout IP address is overwritten in the input form in the left-justified manner (S102). When there is no such IP address, the process awaits downward operation of the cross-shaped key 34 or depression of the button 38A.

When the cross-shaped key 34 is not operated either upward or downward, determination is made as to whether or not the button 38A is pressed (S107). When the button 38A is not pressed, the process returns to the step S103 to monitor key entry again. On the other hand, when the button 38A is pressed, the upper 16 bits of the IP address displayed in the input form at that moment is determined to be part or all of the input IP address (S108).

Determinations are then made as to whether or not the cross-shaped key 34 is operated downward (S109), upward (S112), rightward (S115), and leftward (S119), and as to whether or not the button 38A is pressed (S123). When the cross-shaped key 34 is operated downward (S109), the upper 8 bits (next 8 bits) of the undetermined part of the IP address having the same determined part as, and immediately preceding (i.e. older than), the displayed address in the IP address history are read out (S110), and displayed on the right side of the determined part in the input form (S111). When the cross-shaped key 34 is operated upward (S112), the upper 8 bits (next 8 bits) of the undetermined part of the IP address having the same determined part as, and immediately succeeding (i.e. newer than), the displayed address in the IP address history are read out (S113), and displayed on the right side of the determined part in the input form (S114). When there is no such IP address, the process waits for another key or button to be pressed.

When the cross-shaped key 34 is operated rightward (S115), determination is made as to whether or not the rightward operation is continued for one second or longer (S116). When it is continued, the value corresponding to the upper 8 bits of the undetermined part is rapidly incremented and displayed (S117). When it is not continued, the value corresponding to the upper 8 bits of the undetermined part is incremented at a normal speed and displayed (S118). When the cross-shaped key 34 is operated leftward (S119), determination is made as to whether or not the leftward operation is continued for one second or longer (S120). When it is continued, the value corresponding to the upper 8 bits of the undetermined part is rapidly decremented and displayed (S121). When it is not continued, the value corresponding to the upper 8 bits of the undetermined part is decremented at a normal speed and displayed (S122). Further, when the button 38A is pressed (S123), the 8 bits currently being set are determined (S124).

When the entire IP address is determined (S125), the address input support is terminated, and the process returns to the main game process. The IP address determined through the above-described process is utilized in the main game process as the IP address of an on-line opponent. On the other hand, when the IP address is not completely determined (i.e. when the last 8 bits are yet to be input), the controller is monitored again for the input of the last 8 bits whether or not the cross-shaped key 34 is operated downward (S109), upward (S112), rightward (S115), and leftward (S119), and whether or not the button 38A is pressed (S123).

According to the game device 10 described above, the IP address of an opponent can be stored in the RAM 26 or a memory card to record the IP address history when a player enjoys an on-line game with the opponent. Further, the cross-shaped key 34 is operated upward or downward to sequentially display a part or all of the network number of each IP address in the history, and the button 38A is pressed to select a part or all of the network number of the input address from those in the history. As a result, the IP address can be quickly input when the opponent has the IP address with the designated network number.

It should be noted that the present invention is not limited to the above-described embodiment.

For example, while the present invention is applied to the support of IP address input of an on-line game opponent in the above description, the invention can be widely applied when an address including a network number and a host number, such as an IP address, must be directly input.

Further, for the sake of simplicity, the upper 16 bits of an IP address in the IP address history are first presented to a player in a sequential manner prompting a selection, regardless of the class of the IP address, in the above description. Thus, while the entire network number is presented to the player when the IP address is a Class B address (such as "143. 90. 9. 20" in the IP address history shown in FIG. 3), the network number of a Class C IP address (such as "192. 168. 90. 10" in the IP address history shown in FIG. 3) is not completely presented to the player. In view of this, the length of the network number may be obtained by checking a class identifier recorded in the 1st to 3rd bits of the IP address in the IP address history, so that the entire network number can be displayed for the player for each IP address to make a selection. More specifically, when the upper 2 bits of an IP address in an IP address history are "10", that IP address is a Class B address, and therefore the upper 16 bits are presented to the player as the network number. When the upper 3 bits are "110", that particular IP address is a Class C address, and therefore the upper 24 bits are presented to the player as the network number. In this manner, the player can input the IP address of the on-line opponent even more easily.

Further, while the above description is based on IPv4 (Internet Protocol Version 4), the present invention can be equally applied to IPv6 (Internet Protocol Version 6).

What is claimed is:

1. A communication device for transmitting data to a destination device identified by an address including a network number and a host number, comprising:

network number acquisition means for acquiring network number data of an address of a destination device during data communication;

network number storage means for sequentially storing the network number data acquired by said network number acquisition means;

network number selection means for selecting a network number or a partial network number from the stored network number data based on a designation made by a user;

input means for accepting user input data including a host number and/or a remaining portion of said network number if only a partial network number is selected from storage; and data transmission means for transmitting data to the destination device identified by the destination address, the destination address including the selected network number or partial network number from storage and the user input data.

2. The communication device of claim 1, wherein the address of the destination device is an IP address.

3. The communication device of claim 1, wherein the destination device is connected to a network identified by the network number in the address of the destination device and the destination device is uniquely identified on the network by the host number in the address of the destination device.

4. A method of inputting an address, including a network number and a host number, of a destination device, comprising:

acquiring network number data of an address of a destination device during data communication;

sequentially storing the acquired network number data;

selecting a network number or a partial network number from the stored network number data;

receiving user input of a host number and/or a remaining portion of said network number if only a partial network number is selected from storage; and determining the address of the destination device based on the selected data from storage and the received user input.

5. The method of claim 4, wherein the address of the destination device is an IP address.

6. The method of claim 4, wherein the destination device is connected to a network identified by the network number in the address of the destination device and the destination device is uniquely identified on the network by the host number in the address of the destination device.

7. An information storage medium storing a program for inputting an address including a network number and a host number, said program being used by a computer for execution of:

acquiring network number data of an address for a destination device during data communication;

sequentially storing the acquired network number data;

selecting a network number or a partial network number from the stored network number data;

receiving user input of a host number and/or a remaining portion of said network number if only a partial network number is selected from storage; and determining the address of the destination device based on the selected data from storage and the received user input.

8. The storage medium of claim 7, wherein the address of the destination device is an IP address.

9. The storage medium of claim 7, wherein the destination device is connected to a network identified by the network number in the address of the destination device and the destination device is uniquely identified on the network by the host number in the address of the destination device.

10. A computer-readable medium encoded with a program for inputting an address including a network number and a host number, said program being used by a computer for execution of:

acquiring network number data of an address of a destination device during data communication;

sequentially storing the acquired the network number data;

selecting a network number or a partial network number from the stored network number data;

receiving user input of a host number and/or a remaining portion of said network number if only a partial network number is selected from storage; and determining the address of the destination device based on the selected data from storage and the received user input.

11. The computer-readable medium of claim 10, wherein the address of the destination device is an IP address.

12. The computer-readable medium of claim 10, wherein the destination device is connected to a network identified by the network number in the address of the destination device and the destination device is uniquely identified on the network by the host number in the address of the destination device.

* * * * *